(12) United States Patent
Lam et al.

(10) Patent No.: US 11,222,042 B2
(45) Date of Patent: Jan. 11, 2022

(54) DOMAIN NAME REGISTRATION AND MANAGEMENT FOR RENEWAL DATE SYNCHRONIZATION

(71) Applicants: Jimmy Lam, Toronto (CA); Michael Runcieman, Toronto (CA); Shuqin Sun, Toronto (CA)

(72) Inventors: Jimmy Lam, Toronto (CA); Michael Runcieman, Toronto (CA); Shuqin Sun, Toronto (CA)

(73) Assignee: AFILIAS LIMITED, Dublin (IE)

( * ) Notice: Subject to any disclaimer, the term of this patent is extended or adjusted under 35 U.S.C. 154(b) by 128 days.

(21) Appl. No.: 16/789,171

(22) Filed: Feb. 12, 2020

(65) Prior Publication Data

US 2020/0250200 A1    Aug. 6, 2020

Related U.S. Application Data

(63) Continuation-in-part of application No. 15/141,700, filed on Apr. 28, 2016, now Pat. No. 10,599,632.

(51) Int. Cl.
    *G06F 16/27*         (2019.01)
    *H04L 29/12*         (2006.01)
    *G06F 16/23*         (2019.01)

(52) U.S. Cl.
    CPC .......... *G06F 16/27* (2019.01); *G06F 16/2365* (2019.01); *H04L 61/1511* (2013.01)

(58) Field of Classification Search
    CPC .. G06F 16/27; G06F 16/2365; H04L 61/1511; H04L 61/302
    See application file for complete search history.

(56) References Cited

U.S. PATENT DOCUMENTS

2002/0083030 A1    6/2002    Yang et al.
2002/0184255 A1    12/2002    Edd et al.
(Continued)

FOREIGN PATENT DOCUMENTS

CA        2 600 790 A1    3/2008
CN        102984299 A    3/2013
(Continued)

OTHER PUBLICATIONS

Internationalized Domain Names FAQ, pp. 1-2 , Oct. 2012.*
(Continued)

*Primary Examiner* — Albert M Phillips, III
(74) *Attorney, Agent, or Firm* — Haynes and Boone, LLP

(57) ABSTRACT

A method for synchronizing management of a plurality of domain names in a Domain Name System (DNS), which method comprises: receiving a synchronization request for synchronizing a first object related to a first renewal date of a first domain name with a second object related to a second renewal date of a second domain name, the synchronization request including an explicit identifier only of the first domain name but not of the second domain name; locate both the first object and the second object in a domain name database; determining a renewal date which is earlier than at least one of the first renewal date and the second renewal date; and synchronizing as a backwards synchronization operation the first object and the second object to both have said renewal date, such that both the first domain name and the second domain name are configured to expire on said renewal date.

19 Claims, 6 Drawing Sheets

(56) References Cited

U.S. PATENT DOCUMENTS

2014/0006641 A1* 1/2014 James .............. H04L 61/2076
709/245
2015/0188883 A1    7/2015 Xie et al.
2017/0316044 A1   11/2017 Cedarampattu et al.

FOREIGN PATENT DOCUMENTS

| | | |
|---|---|---|
| CN | 103501358 A | 1/2014 |
| CN | 103763133 A | 4/2014 |
| CN | 104660724 A | 5/2015 |
| EP | 2680543 A2 | 1/2014 |
| EP | 3239906 A1 | 11/2017 |
| WO | 2014/14147587 A1 | 9/2014 |

OTHER PUBLICATIONS

Ethan, Sync Domain Expiration Dates: Harmonize Your Domain Name Renewal, pp. 1-6. Oct. 4, 2012.*
U.S. Appl. No. 16/789,148, filed Feb. 12, 2020, Cedarampattu et al.
European Patent Office, Extended European Search Report for EP Application No. 17168787.4, dated Sep. 11, 2017, 6 pages.

* cited by examiner

DOMAIN NAME REGISTRATION AND MANAGEMENT FOR RENEWAL DATE SYNCHRONIZATION

CROSS-REFERENCE TO RELATED APPLICATION

This application is a continuation-in-part of U.S. patent application Ser. No. 15/141,700 entitled "DOMAIN NAME REGISTRATION AND MANAGEMENT", filed on Apr. 28, 2016, the disclosure of which is hereby incorporated herein by express reference thereto.

FIELD

The present invention is related to registration and management of domain names.

BACKGROUND

Domain names are used in various networking contexts and application-specific naming and addressing purposes. In general, a domain name represents an Internet Protocol (IP) resource, such as a personal computer used to access the Internet, a server computer hosting a web site, or the web site itself or any other service communicated via the Internet. In 2014, the number of active domains reached 271 million. Today's Internet presence by companies is considered a critical element of their business.

There are a number of good reasons for having a domain name. If you ever change your web host, your domain name goes with you. Your regular visitors or customers who knew your site name would not have to be informed about a change of web address (also known as "URL"). They would simply type your domain name and they'd be brought to your new site. If you are a business, a domain name gives you credibility. Few people will be willing to do business with a company that does not have its own domain name. If you get a domain name that describes your company's business or name, people can remember the name easily and can return to your site without having to consult their documents.

Registering with a domain name registrar allows a registrant to make sure that they are registered as the owner, the administrative and technical contacts. Being the owner is vital—if someone else places himself as the owner (such as your web host), he can always decide to charge you some exorbitant fee for the use of the name later. As such obtaining and retaining proper rights to a registrant's domain name portfolio is key in today's competitive landscape.

It is a disadvantage with the current domain name registration and management systems that a registrant's plurality of domain names must be individually registered and subsequently individually maintained (e.g. renewals, etc.). It is critical that registry information relating to the various domain names of a registrant be complete, consistent, accurate, and up to date. As such, it is critical that the domain name registrant keep their domain name records up to date to prevent undesirable expense, complication and worst-case loss of domain name rights. The coordination involved by the registrant in today's multi-TLD universe is becoming increasingly complex, due to the increased availability in the number and variety of domain names.

BRIEF DESCRIPTION OF THE DRAWINGS

Exemplary embodiments of the invention will now be described in conjunction with the following drawings, by way of example only, in which.

SUMMARY

Figure 1:
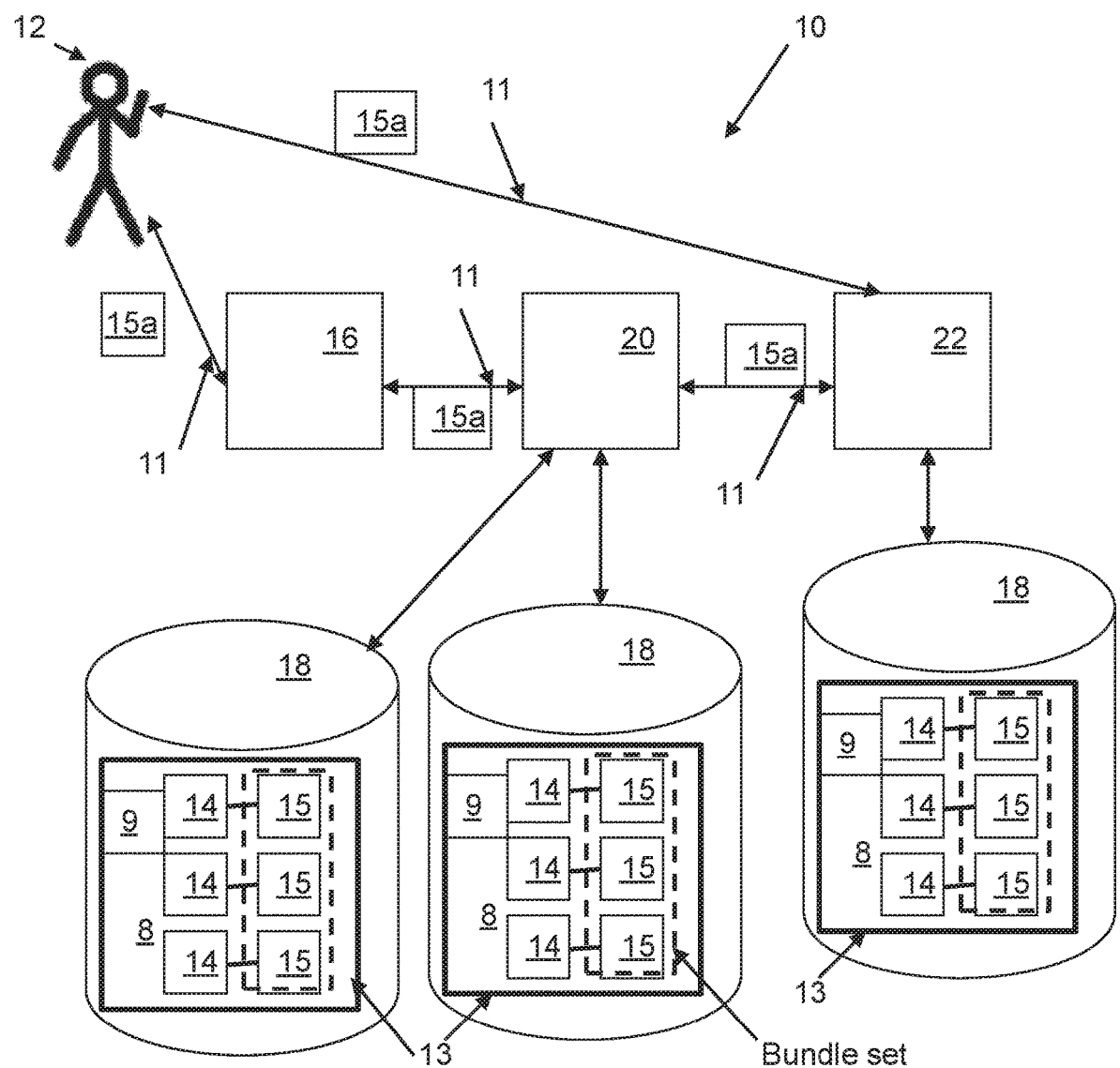
FIG. 1 is a block diagram of components of a domain name registration and maintenance system.

A preferred advantage of the present invention is to provide a system and method for domain names to obviate or mitigate at least some of the above presented disadvantages.

A first aspect provided is a method for synchronizing management of a plurality of domain names in a Domain Name System (DNS), the method comprising the steps of: receive a synchronization request for synchronizing a first object related to a first renewal date of a first domain name with a second object related to a second renewal date of a second domain name, the first object unique to the first domain name and the second object unique to the second domain name, the first object and the second object stored in a domain name database and the second domain name associated with a domain name bundle, the synchronization request including an explicit identifier only of the first domain name but not of the second domain name; use a bundle identifier of the domain name bundle associated with the explicit identifier of the first domain name to access a domain name list of the domain name bundle in order to identify the second domain name; locate both the first object and the second object in the domain name database; determine a renewal date which is earlier than at least one of the first renewal date and the second renewal date; synchronize as a backwards synchronization operation the first object and the second object to both have said renewal date, such that both the first domain name and the second domain name are configured to expire on said renewal date; and send a synchronization response confirming the synchronization request.

A second aspect provided is a method for synchronizing management of a plurality of domain names in a Domain Name System (DNS), the method comprising the steps of: receive a synchronization request for synchronizing a first object related to a first renewal date of a first domain name with a second object related to a second renewal date of a second domain name, the first object unique to the first domain name and the second object unique to the second domain name, the first object and the second object stored in a domain name database and the second domain name being an existing member of a domain name bundle, the synchronization request including an explicit identifier of the domain name bundle but not of first domain name nor of the second domain name; use the explicit identifier as a bundle identifier of the domain name bundle associated to access a domain name list of the domain name bundle in order to identify the first domain name and the second domain name; locate both the first object and the second object in the domain name database; determine a renewal date which is earlier than at least one of the first renewal date and the second renewal date; synchronize as a backwards synchronization operation the first object and the second object to both have said renewal date, such that both the first domain name and the second domain name are configured to expire on said renewal date; and send a synchronization response confirming the synchronization request.

A third aspect provided is a method for synchronizing management of a plurality of domain names in a Domain Name System (DNS), the method comprising the steps of: receive a synchronization request for synchronizing a first object related to a first renewal date of a first domain name with a second object related to a second renewal date of a second domain name, the first object unique to the first domain name and the second object unique to the second domain name, the first object and the second object stored in a domain name database and the second domain name being an existing member of a domain name bundle, the synchronization request including an explicit identifier only of the first domain name but not of the second domain name; use a bundle identifier of the domain name bundle associated with the explicit identifier of the first domain name to access a domain name list of the domain name bundle in order to identify the second domain name; locate both the first object and the second object in the domain name database; determine a renewal date which is earlier than at least one of the first renewal date and the second renewal date and calculate a backwards aggregate cost of a backwards synchronization operation; calculate a forwards aggregate cost of a forwards synchronization operation, the forwards aggregate cost using said renewal date as a date later than the at least one of the first renewal date and the second renewal date, such that the backwards aggregate cost is less than the forwards aggregate cost; synchronize as the backwards synchronization operation the first object and the second object to both have said renewal date, such that both the first domain name and the second domain name are configured to expire on said renewal date; and send a synchronization response confirming the synchronization request.

A fourth aspect provided is a method for synchronizing management of a plurality of domain names in a Domain Name System (DNS), the method comprising the steps of: receive a synchronization request for synchronizing a first object related to a first renewal date of a first domain name with a second object related to a second renewal date of a second domain name, the first object unique to the first domain name and the second object unique to the second domain name, the first object and the second object stored in a domain name database and the second domain name being an existing member of a domain name bundle, the synchronization request including an explicit identifier of the domain name bundle but not of first domain name nor of the second domain name; use the explicit identifier as a bundle identifier of the domain name bundle associated to access a domain name list of the domain name bundle in order to identify the first domain name and the second domain name; locate both the first object and the second object in the domain name database; determine a renewal date which is earlier than at least one of the first renewal date and the second renewal date and calculate a backwards aggregate cost of a backwards synchronization operation; calculate a forwards aggregate cost of a forwards synchronization operation, the forwards aggregate cost using said renewal date as a date later than the at least one of the first renewal date and the second renewal date, such that the backwards aggregate cost is less than the forwards aggregate cost; synchronize as a backwards synchronization operation the first object and the second object to both have said renewal date, such that both the first domain name and the second domain name are configured to expire on said renewal date; and send a synchronization response confirming the synchronization request.

DETAILED DESCRIPTION OF THE PREFERRED EMBODIMENT(S)

Referring to FIG. 1, shown is a domain name registration and implementation system 10 providing for a domain name registrant 12 (e.g. domain owner) to request and obtain over a communications network 11 (i.e. the Internet) a bundle 13 of domain names 14 from a domain name registrar 16 for multiple domain names 14 (aggregated into the common bundle 13) available (e.g. not yet claimed) in a domain name registry database 18 (e.g. a database of all domain names registered in a top-level domain (TLD)), which can be managed by a registry operator 20 that also generates zone files which convert domain names to IP addresses. The bundle 13 can be considered as a collection or grouping of individual domain names 14, such that the individual domain names 14 are members of the bundle 13 (i.e. each of the domain name 14 members of the bundle 13 have the same bundle ID 8 associated therewith). It is important to recognize that domain name(s) 14 can: become member(s) upon creation of the bundle 13 (e.g. a group of initial domain names 14 are formed as the bundle 13); can become member(s) subsequent to creation of the bundle 13 (e.g. one or more domain names 14 can be added to an existing bundle 13 of domain names 14); or can cease to be a member of the bundle 13 (e.g. a domain name 14 member of the bundle 13 can be removed from membership of the bundle 13). An advantageous application for management of the domain names 14 of the bundle 13 is for synchronization of the domain name expiry dates, thus facilitating the renewal process for those registrants 12 that have a plurality of different domain names 14. In particular, the bundle 13 provides for synchronizing of dissimilar expiry dates of multiple domain names 14, in an effort to synchronize and thus simplify the maintenance of a multiple domain name 14 portfolio contained within the bundle 13, as further described below.

The domain name registration and implementation system 10 facilitates management of a plurality of the domain names 14 considered members in the common bundle 13 via a set of synchronized objects 15 associated explicitly with the bundle 13 and thereby associated implicitly with each of the domain names 14 in the bundle 13. It is recognized that the synchronized objects 15 can include the Domain Registration Date object DRD and the Domain Expiry Date object DED, see FIG. 4. Further, as described below, actions 17 can be taken on the objects 15 of the domain names 14 of the bundle 13. These actions 17 on the objects 15 can be facilitated by requests 32, 35 and responses 34 between particular entities 12,16,20,22 of the system 10 via the network 11.

It is recognized that the domain names 14 in the bundle 13 can be distributed across more than one database 18, for example a portion of the domain names 14 of the bundle 13 stored in one database 18 while the remaining portion of the domain names 14 in the bundle 13 stored in a second database 18 separate from the first database 18. In any event, it is recognized that a bundle list 9 of all the domain names 14 present as members in the bundle 13 can be stored in one or more of the databases 18, such that the bundle list 9 is used to match any incoming requests 32, 35 from the registrar 16 (for example) for a particular domain name 14 to all other domain names 14 present in the bundle 13. Once the request 32, 35 is processed, then a corresponding result/response 34 is provided. It is also recognized that each of the domain names 14 can have associated with them the bundle ID 8 to indicate specific bundle membership, such that each domain name 14 is cross referenced with their respective bundle 13 by the bundle ID 8. As such, the database 18 can have a list of all bundles 13 contained, either in whole or in part, within the database 18 and identifiable as such by the bundle ID 8 (representing bundle 13 membership for a particular domain name 14) contained in the list of bundles 13.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that the domain name registrar 16, the registry operator 20 and the registry services provider 22 can be implemented on computer devices 100 (see FIG. 3) such as servers and can communicate with one another via the network 11 in client-server relationships, in order to facilitate the communication of the requests 32, 35 and responses 34 (see FIG. 2). As further described below, the requests 32, 35 and responses 34 can be communicated using a communication protocol (e.g. EPP).

Domain Names 14

A domain name 14 can be referred to as an identification string which is organized in subordinate levels (subdomains) of a DNS root domain, which is nameless. Each domain name 14 consists of one or more parts, technically called labels, that are conventionally concatenated, and delimited by dots, such as label3.label2.label1. The first-level set (e.g. label1) of domain names 14 are the top-level domains (TLDs), including the generic top-level domains (gTLDs), such as the prominent domains info, edu, and org, and the country code top-level domains (ccTLDs). Below these top-level domains in the DNS hierarchy are the second-level (e.g. label2) and third-level (e.g. label3) domain names 14 that are typically open for reservation by end-users who wish to connect local area networks to the Internet 11, create other publicly accessible Internet resources, or run web sites. The registration of these domain names 14 can be administered by the domain name registrars 16, who sell their services to the public. The hierarchy of domains descends from the right to the left label in the domain name 14; each label to the left specifying a subdivision, or subdomain of the domain to the right.

For example, the top-level domains (TLDs) such as .info and .org are the highest level of domain names of the Internet 11, whereby top-level domains form the DNS root zone of the hierarchical Domain Name System, such that every domain name 14 ends with a top-level domain label. In terms of the bundle 13 as a specific collection of domain names 14, each of the domain names 14 has a series of parent-child pairings for the labels, e.g. for the example domain name 14 label3.label2.label1—label3 is the parent of label2 as the child, label2 is the parent of label1 as the child, whereby one of the labels in the pairing is allowed to vary while the other of the labels in the pairing remains constant. In other words, an example bundle 13 of domain names 14 could be such as but not limited to: a set of Top Level Domains (TLDs) of the same second level domain (e.g. label2.a, label2.b, label2.c such that "a", "b", "c" are different versions of label1); a set of second level domains (SLDs) of the same third level domain (e.g. label3.a.label1, label3.b.label1, label3.c.label1 such that "a", "b", "c" are different versions of label2); a set of Top Level Domains (TLDs) of different second level domains (e.g. a.label1, b.label1, c.label1 such that "a", "b", "c" are different versions of label2); a set of second level domains (SLDs) of different third level domains; and/or lower level domains (e.g. a.label2.label1, b. label2.label1, c. label2.label1 such that "a", "b", "c" are different versions of label3). It is also recognize that an example bundle 13 of domain names 14 can be represent as having all domain levels differ, for example domain name label3.label2.label1 such that each of the label3, label2, label1 are different (i.e. there are no common or constant labels between each of the domain names 14 in the bundle 13 (e.g. bundle 13 comprised of domains a.b, c.d, e.f, etc.)

The registration of these domain names 14 is administered by domain name registrars 16 who sell their services to the public (i.e. registrants 12). The TLD names 14 such as .info, .org, .mobi are the highest level of domain names of the Internet 11. Top-level domains form a DNS root zone of a hierarchical Domain Name System implemented on the Internet 11. Every domain name 14 ends with a top-level domain label. Below the top-level domains in the domain name hierarchy are the second-level domain (SLD) names 14. These are the names directly to the left of the top-level domains. As an example, in the domain example.co.info, co is the second-level domain. Second-level domains commonly refer to an organization (e.g. registrant 12) that registered the domain name 14 with the domain name registrar 16. Some domain name registry operators 20 introduce the second-level hierarchy to the TLD that indicates a type of entity intended to register an SLD under it, for example, in the .org namespace a college or other academic institution could register under the .ac.info ccSLD, while companies could register under .co.info. Next are third-level domain names 14, which are written immediately to the left of the second-level domain, recognising that there can be fourth- and fifth-level domains, and so on, with virtually no limitation. As such, it is recognised that the domain name bundle 13 can contain multiple domain names 14 considered as a single group of domain names having common synchronized objects with one another to facilitate management of each of the domain names 14 in the domain name bundle 13, as further described below. One example of a domain name bundle 13 could be a grouping of TLDs associated with color, e.g. .red, .orange, .blue, .green, etc.

Domain names 14 can be referred to as domains and domain name registrants 12 can be referred to as domain owners, although domain name registration with the registrar 16 may not confer any legal ownership of the domain name 14, only an exclusive right of use for a particular duration of time. As such, the domain name 14 can be considered an economic asset utilized as an identification string defining a realm of administrative autonomy, authority or control within the Internet 11. The domain names 14 are formed by the rules and procedures of the Domain Name System (DNS), such that any name registered in the DNS is a domain name 14. Domain names 14 can also be thought of as a location on the Internet 11 where certain information or activities can be found. A fully qualified domain name (FQDN) is a domain name 14 that is completely specified in the hierarchy of the DNS, having no parts omitted.

In terms of importance to functioning of the Internet 11 for searching for and accessing Internet 11 resources, domain names 14 serve as names for these Internet 11 resources such as computers, networks, and services. The domain name 14 represents an Internet Protocol (IP) resource and specifically, individual Internet host computers use domain names 14 as host identifiers, or host names (e.g. leaf labels in the domain name system usually without further subordinate domain name space). Of importance to Internet 11 navigation, host names appear as a component in Uniform Resource Locators (URLs) for Internet 11 resources such as web sites (e.g., Afilias.info). Domain names 14 can also be used as simple identification labels to indicate ownership or control of a resource. Such examples are the realm identifiers used in the Session Initiation Protocol (SIP), the Domain Keys used to verify DNS domains in e-mail systems, and in many other Uniform Resource Identifiers (URIs). An important function of domain names 14 is to provide easily recognizable and memorizable names to numerically addressed Internet 11 resources. Usability of the domain names 14 as an abstraction provides any resource to be moved to different physical locations in the address topology of the network 11, globally or locally in an intranet. Such a move usually involves changing the IP address of the resource and the corresponding translation of this IP address to and from its domain name 14.

Referring again to FIG. 1, the registry operator 20 can also interact with the registry services provider 22 responsible for services/capabilities facilitating smooth and efficient operation of any type of domain registry database 18. For example, the registry services provider 22 can provide to the registry operator 20 a standards-based, EPP (as one example of the communication protocol) registry system facilitating a reliable, secure platform for domain operations. Further, the registry services provider 22 can provide a distributed DNS system facilitating domain availability on the Internet 11 coupled with provision of state of the art security against attack and abuse. Further, the registry services provider 22 can provide launch or improvement assistance for the domains identified by the domain names 14 of the domain name bundle 13. Further, the registry services provider 22 can provide registry solutions and accommodate policy needs for the domain. It is also recognized that the registry services provider 22 can implement all or a subset of the registry functionality and support services on behalf of the registry operator 20 (for example the registry services provider 22 can be the registry operator 20 for a selected domain name bundle 13).

Registration and maintenance of domain names 14 in the domain name bundle 13 involves management of synchronized objects 15 associated with each of the domain names 14 in the domain name bundle 13. These objects 15 are populated with appropriate data based on action(s) 17 performed on the objects 15 (e.g. update/modification, delete/del, transfer, renew, etc.). Example actions 17 on the objects 15 for the domain name bundle 13 are such as registration/purchase of the domain names 14 as the bundle 13 by the registrant 12 from the registrar 16. Other example actions 17 on the objects 15 can include management by the Registry Operator 20 of up-to-date data in the objects 15 concerning domain name and name server registrations maintained by the Registry Operator 20, useful in verifying and providing operational stability of Registry Services and the DNS.

Example Objects 15

Figure 2:
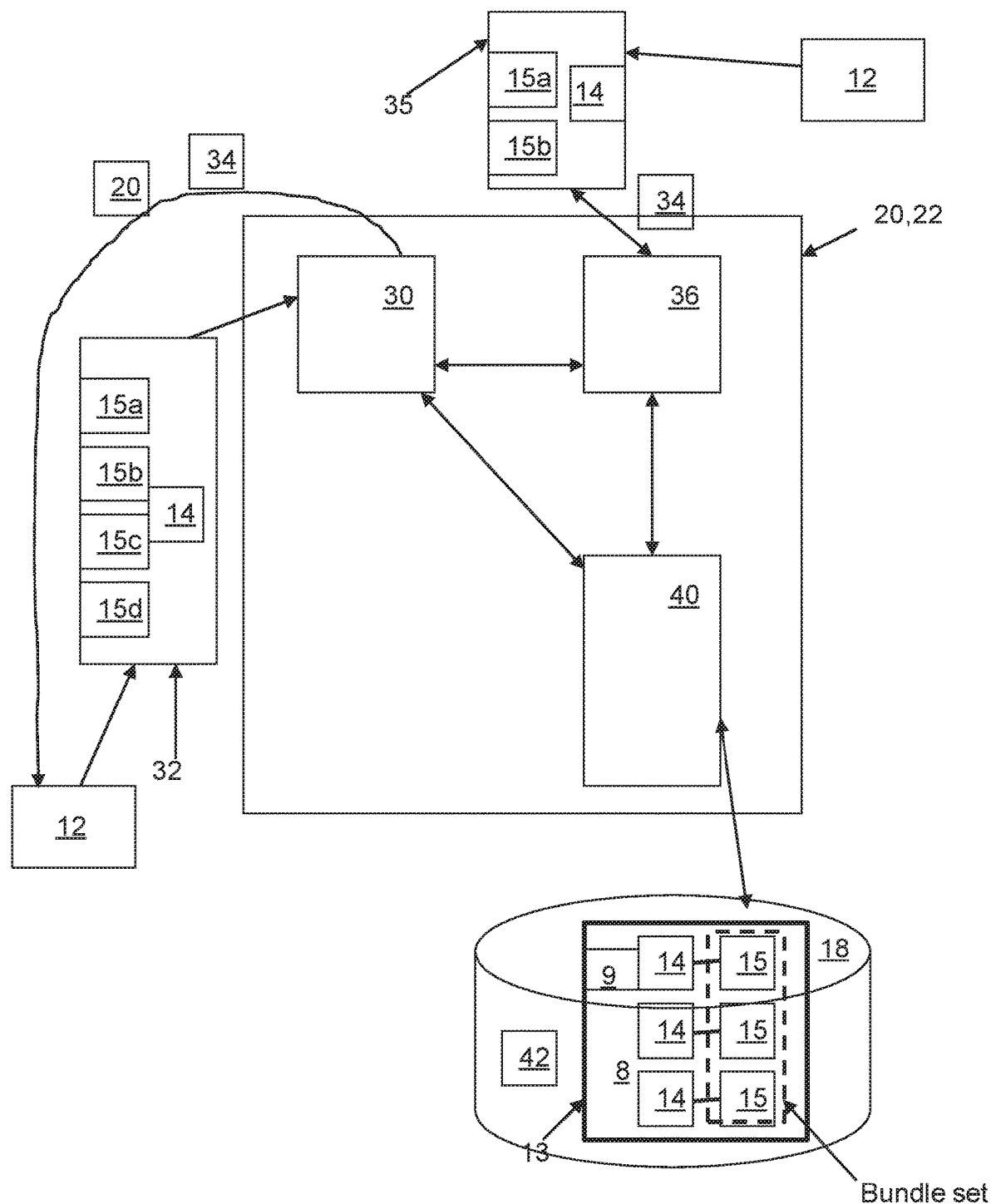
FIG. 2 is a block diagram of an example implementation for the system of FIG. 1.
Figure 4:
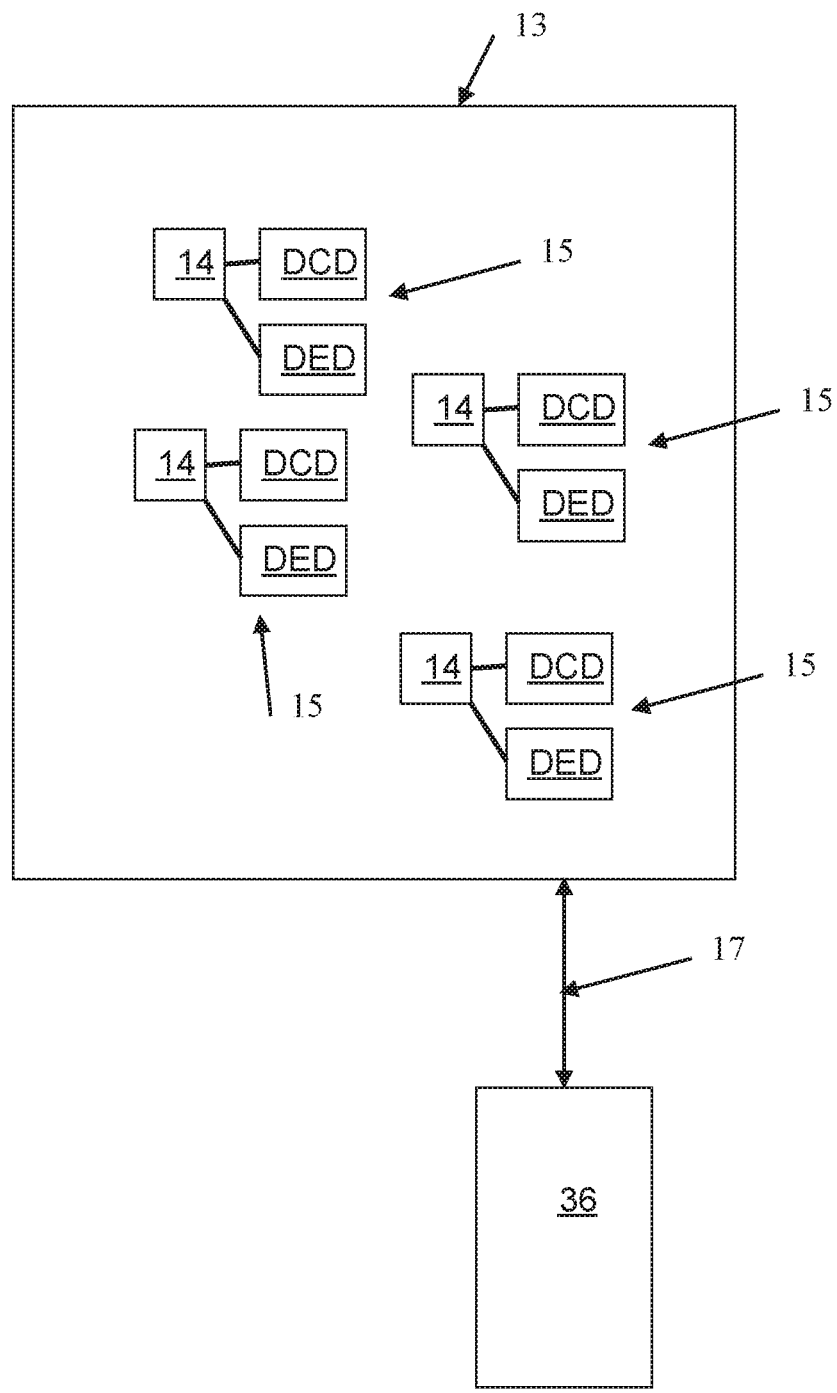
FIG. 4 is an example configuration of the bundle of FIG. 1 including example objects.

Referring to FIGS. 1,2,4, the specification of the content and format of this data of the objects 15 can be such as but not limited to:

1. Registrar objects. The registrar object corresponds to a single registrar. It can include the following data:

Registrar ID (conforming to the IANA registrar-ids registry)
Contact ID of Registrar
Registrar Administrative Contacts
Registrar Technical Contacts
Registrar Billing Contacts
Registrar URL
Registrar Creation Date
Registrar Last Updated Date 2. Contact objects. The contact object corresponds to a single contact (whether registrant, administrative, technical or billing contact). The contact object includes the following data:

Contact ID
Contact Name
Contact Organization
Contact Address, City, State/Province, Country
Contact Postal Code
Contact Phone, Fax, E-mail 3. Nameserver objects. A nameserver object corresponds to a single registered nameserver. The nameserver object includes the following data:

Name Server ID
Name Server Host Name
Name Server IP Addresses if applicable
Current Registrar
Name Server Creation Date
Name Server Last Updated Date 4. Domain objects. The domain object corresponds to a single Registered Name. Each domain object includes the following data:

Domain ID
Domain Name
Sponsoring Registrar
Domain Status
All contact information (including all details) with at least one each of:
   Registrant
   Administrative
   Technical
   Billing
All nameservers associated with this domain
Domain Registration Date (e.g. Domain Registration Date object DRD)
Domain Expiration Date (e.g. Domain Expiry Date object DED)
Domain Last Updated Date In view of the above, referring to FIG. 4, it is recognised that in particular each of the domain names 14 of the bundle 13 are associated with a corresponding Domain Registration Date object DRD and a corresponding Domain Expiry Date object DED. It is recognised that the Domain Registration Date objects DRD of the bundle 13 can be synchronized or not (i.e. they can have the same chronological value or they can have different chronological values—recognising that the format of the values can include both the date and time, for example 1999-04-03 22:00:00.0 meaning Apr. 3, 1999 at 10 PM). Similarly, it is recognised that the Domain Expiry Date objects DED of the bundle 13 can be synchronized or not (i.e. they can have the same chronological value or they can be different chronological values). Typically, each of the domain names 14 has a respective instance of each object 15 associated therewith. However, it is also recognised that the bundle 13 itself can have a common object 15 associated therewith, such that each of the domain names 14 of the bundle 13 inherit the value of the common object 15 for themselves. For example, in the case where the bundle 13 itself has a common object 15 of a Domain Registration Date object DRD having a chronological time/date instance of X, then all of the domain names 14 of the bundle 13 would also have the same DRD=X. For example, in the case where the bundle 13 itself has a common object 15 of a Domain Expiry Date object DED having a chronological time/date instance of Y, then all of the domain names 14 of the bundle 13 would also have the same DED=Y. As such, a common object 15 to the bundle 13 would be viewed as a synchronized object 15 (e.g. of value X) that pertains to each and every domain name 14 that is a member of the bundle 13. As described above, it is also recognised that not every instance of a particular object type (e.g. DRD) for each of the domain names 14 (of the bundle 13) would be synchronized. In this case of non synchronization, each of the particular domain names 14 of the bundle 13 would have their own instance (i.e. value). For example, in the bundle 13 shown in FIG. 4, each of the 4 objects DRD could have different values (i.e. different dates and/or times), one of objects DRD could have a different value with the other three objects DRD having the same value, etc. Similarly, for example, in the bundle 13 shown in FIG. 4, each of the 4 objects DED could have different values (i.e. different dates and/or times), one of objects DED could have a different value with the other three objects DRD having the same value, etc.

As further discussed below, various actions 17 (see FIG. 4) can be performed on the objects 15 of the bundle 13 by a registry operator 20 and/or a registry services provider 22, via the requests 32, 35 and responses 34, in order to change the values/instances of the objects 15. The requests 32, 35 would contain identification of the bundle 13 and/or the domain name(s) 14 under consideration as well as the intended action 15 on a particular object 15. One example request 32, 35 could be a change (e.g. action 17) in the renewal data (e.g. object 15) for a specified domain name 14. As such, other objects 15 (of other domain names 14 in the bundle 13) synchronized with the object 15 of the request 32, 35 would also be subject to the same action 17 specified in the request 32, 35. The affected domain names 14 (by the action 17 of the request 32, 35) in the bundle 13 would be known to the system 10 by way of their common bundle ID 8 (e.g. by way of a list 9 of all domain names 14 resident in the bundle 13). As such, a domain name 14 specified in the request 32, 35 could be matched to all other domain names 14 in its bundle 13 by way of the shared bundle ID 8 (i.e. all domain names 14 of the bundle 13 have the same bundle ID 8).

It is recognized that registrant 12 itself can communicate directly with the registrar 16, the Registry Operator 20 and/or the registry services provider 22 for registration and/or maintenance information 26 (see FIG. 2) used in registration and maintaining of the domain names 14 associated with the bundle 13 via coordinating the data content (via the specified actions 17 of the requests 32,35) of the synchronized objects 15, and/or can communicate registration and/or maintenance information 26 indirectly with registry services provider 22 via registry operator 20. Further, registry operator 20 can supply any requested registration and/or maintenance information 26 to registry services provider 22 on behalf of registrant 12. As such, the registration and/or maintenance information 26 is considered data used to populate the synchronized objects 15 based on actions 17 (e.g. update, delete, transfer, renew, etc.) performed on the synchronized objects 15. It is also recognised that the registrar 16 can communicate a request for the action 17 to the registry operator 22 and/or the registry services provider 22 on behalf of the registrant 12.

Example Actions 17

Actions 17 can be provided to registry operator 20 and/or the registry services provider 22 via the requests 32, 35. These actions 17 would be processed as commands by a command module 36 (see FIG. 2). The command module 36 could be responsible for interacting with the provider of the request 32, 35 (e.g. the registrant 12 and/or the registrar 16), in order to facilitate execution of the action 17 contained in the request 32, 35.

An action 17 can be defined as an operation on an object 15 unique to each of the plurality of domain names 14 of the DNS, realizing that each of the plurality of the domain names 14 in their bundle 13 has the same data contents in their object 15 as is in a corresponding object 15 associated with another domain name 14 of the bundle 13, thus providing for synchronized objects 15 of the bundle 13. An example action 17 can be assigning the domain names 14 of the domain name bundle 13 to a new domain name registrant 12. An example action 17 can be assigning the domain name(s) 14 of the domain name bundle 13 to a new bundle 13, and thus deleting the domain name(s) 14 from their current bundle 13. As such, in a change of bundle 13 membership, the changed domain name(s) 14 would have their corresponding bundle ID 8 also changed. An example action 17 can be simply deleting the domain name(s) 14 from their current bundle 13, recognizing that the bundle ID 8 of the deleted domain name(s) 14 would be then null, i.e. no bundle 13 association. An example action 17 can be simply assigning the domain name(s) 14 to a new bundle 13, and thus changing or otherwise assigning the corresponding bundle ID 8 to the domain name(s) 14 (e.g. from a null value to a current value for the bundle ID 8). Alternative actions 17 for existing bundles 13 can include actions such as but not limited to check, info/status, update/mod, delete/del, transfer, and/or renew.

The action 17 can be based on a communication protocol such as Extensible Provisioning Protocol (EPP) or Registry Registrar Protocol (RRP). The Extensible Provisioning Protocol (EPP) is a flexible protocol designed for allocating objects within registries over the Internet. EPP provides a robust and flexible protocol that facilitates transaction communications between domain name registry service providers 22 and domain name registrars 16. These transactions are used whenever a domain name 14 is acted upon using actions 17 such as to effect data content of the domain name objects 15 to reflect registered, transferred, renewed or otherwise amended domain names 14. As such, the EPP protocol is used to implement an order (request action 17 on an object) and fulfillment (perform and report result of object when acted upon) system. Specified in XML, EPP can provide basic service elements, such as but not limited to: a greeting, commands (e.g. actions 17), responses (e.g. to the actions 17 effecting changes to data content of the objects 15 associated with the actions 17), and an extension framework that supports future definition of managed objects 15 and the relationship of EPP protocol requests (e.g. actions 17) and responses to those objects 15. It is recognised that actions of EPP are expressed as XML, a structured, text-based format, such that communication over the network 11 of the actions between entities 16,18,20,22 can be specified over TCP communication messaging and/or other transport communication messaging such as BEEP, SMTP, or SOAP.

As discussed, an example communication protocol for the requests 32, 35 and the responses 34 can be EPP. It is recognised that the communication protocol used can provide various different actions 17 in order to transform the objects 15, such as but not limited to: create 17 an instance of a domain object 15 (e.g. <create> for EPP); delete 17 an instance of a domain object 15 (e.g. <delete> for EPP); extend 17 the validity period of a domain object 15 (e.g. <renew> for EPP); manage 17 domain object 15 sponsorship changes (e.g. <transfer> for EPP); and change 17 information associated with a domain object 15 (e.g. <update> for EPP). Further, synch 17 (e.g. <synch>, also can be referred to as <domainSync:update>) can be used to synchronize the domain name expiry dates for the domain names 14 of the bundle 13. Importantly, the action of synch 17 for domain names 14 of the bundle 13 can be used to synchronize the expiry dates of all of the member domain names 14, i.e. to make all of the expiry dates (e.g. an object 15) of the member domain names 14 the same. In this manner, once synchronized, then advantageously the registry operator 20 and/or the registry services provider 22 can provide the renewal action 17 in the request 32, 35 along with identification of one of the member domain names 14 and/or the bundle ID 8. In this way, a simple request 32, 35 can be made for renewal, all at once, for all of the domain names 14 in the bundle 13, thus employing advantageously a straight forward way of updating the renewals for all domain names 14 which are members of the bundle 13 (i.e. those domain names 14 sharing the same synchronized object(s) 15 for the expiry date).

In terms of the create action 17 for a new domain name 14, the action 17 using the EPP version of the communication protocol can be provided as the <create> command (i.e. action 17) in the request 32, 35 to provide a transform operation that allows a client (e.g. registrar 16) to create a domain object, for example to create the domain object 15 (e.g. a domain name 14) as a new domain name 14 to add to the bundle 13. In addition to the standard EPP command elements, the <create> command contains a <domain:create> element that identifies the domain namespace (i.e. the domain name 14). The <domain:create> element contains the following child elements of a <domain:name> element that contains the fully qualified name of the domain object 15 to be created, an OPTIONAL <domain:period> element that contains the initial registration period of the domain object 15, as well as the server (e.g. the registry operator 20 or the registry services provider 22) can define a default initial registration period (e.g. as an appropriate object 15) if not specified by the client (in order to define the expiry date of the domain name 14 and hence the renewal term). The request 32, 35 for the create request 32, 35 could also contain the bundle ID 8 for the new domain name 14, in order for the new domain name 14 to be added to the specified bundle 13. In terms of the response 34 associated with the create request 32, 35, in terms of using the EPP as the example communication protocol, the EPP <create> response could include the confirmation information of <domain:crDate>1999-04-03T22:00:00.0Z</domain:crDate> (e.g. the DRD object 15) and <domain:exDate>2001-04-03T22:00:00.0Z</domain:exDate> (e.g. the DED object 15).

In terms of the delete action 17 for a new domain name 14, the action 17 using the EPP version of the communication protocol can be provided as the EPP <delete> command (e.g. action 17) in the request 32, 35 to provide a transform operation that allows the client to delete a domain object 15, for example to delete the domain object 15 (e.g. a domain name 14) from the bundle 13. In addition to the standard EPP command elements, the <delete> command contains a <domain:delete> element that identifies the domain namespace (i.e. associated with the domain name 14). The <domain:delete> element contains the following child elements; a <domain:name> element that contains the fully qualified name of the domain object 15 to be deleted.

In terms of the transfer action 17 for a domain name 14, the action 17 using the EPP version of the communication protocol can be provided as the <transfer> command (i.e. action 17) in the request 32, 35 to provide a transform operation that allows a client (e.g. registrar 16) to transfer a domain object, for example to transfer the domain object 15 (e.g. a domain name 14) as a new domain name 14 to add to the bundle 13 as the domain name 14 is being transferred from one registrant 12 (e.g. CLIENTX to a new registrant (e.g. CLIENTY). In addition to the standard EPP command elements, the <transfer> command contains a <domain:transfer> element that identifies the domain namespace (i.e. the domain name 14). The <domain:transfer> element contains the following child elements: a <domain:name> element that contains the fully qualified name of the domain object 15 for which a transfer request 32, 35 is to be created, approved, rejected, or cancelled, an OPTIONAL <domain:period> element that contains the number of units to be added to the registration period of the domain object at completion of the transfer process, a <domain:authInfo> element that contains authorization information associated with the domain object 15 or authorization information associated with the domain object's 15 registrant 12 or associated contacts, and an OPTIONAL "roid" attribute used to identify the registrant 12 or contact object 15 if authInfo is associated with a registrant 12 or contact object 15. The request 32, 35 for the transfer request 32, 35 could also contain the bundle ID 8 for the transferred domain name 14, in order for the transferred domain name 14 to be added to the specified bundle 13. When the <transfer> command/action 17 has been processed successfully, the EPP response 34 contains a child <domain:trnData> element that identifies the domain namespace. The <domain:trnData> element contains the same child elements defined for the transfer query response 34. An example <transfer> response 34 could include the EPP content of: <domain:reID>ClientX</domain:reID>; <domain:reDate>2000-06-08T22:00:00.0Z</domain:reDate>; <domain:acID>ClientY</domain:acID>; <domain:acDate>2000-06-13T22:00:00.0Z</domain:acDate>; and <domain:exDate>2002-09-08T22:00:00.0Z</domain:exDate>, thus defining the new DRD object 15 for the transferred domain name 14 as well as the DED object 15 for the transferred domain name 14.

In terms of the renew action 17 for all of the domain names 14 having a synchronized expiry date object 15, the action 17 using the EPP version of the communication protocol can be provided as the <renew> command (i.e. action 17) in the request 32, 35 to provide a transform operation that allows a client (e.g. registrar 16) to renew all the domain objects 15 that are synchronized (e.g. to extend the validity period of the synchronized domain objects 15), for example to renew the domain objects 15 (e.g. the domain names 14) of the bundle 13 together in order to efficiently and straightforwardly change all of the expiry dates, e.g. the DED objects 15 at the same time. In addition to the standard EPP command elements, the <renew> command contains a <domain:renew> element that identifies the domain namespace (e.g. the domain name 14). The <domain:renew> element contains the following child elements: a <domain:name> element that contains the fully qualified name of the domain object 15 whose validity period is to be extended (which will also be used to identify those other domain names 14 in the bundle 13 that are members having the domain object 15 as synchronized); a <domain:curExpDate> element that contains the date on which the current validity period ends (e.g. a value that provides that repeated <renew> commands do not result in multiple unanticipated successful renewals); and an OPTIONAL <domain:period> element that contains the number of units to be added to the registration period of the domain object 15 (i.e. the number of units that will be used to redefine the DED object 15). When a <renew> command/action 17 has been processed successfully, the EPP based response 34 would contain a child <domain:renData> element that identifies the domain namespace (i.e. the domain name 14). The <domain:renData> element contains the following child elements: a <domain:name> element that contains the fully qualified name of the domain object 15; an OPTIONAL <domain:exDate> element that contains the date and time identifying the end of the domain object's 15 registration period. In terms of an example <renew> response 34 message, this could include the EPP content of: <domain:name>example.org</domain:name>, <domain:exDate>2005-04-03T22:00:00.0Z</domain:exDate>, thus defining the new DED object 15 for the renewed domain name 14 e.g. example.org). An example validity period of the domain name 14 can be measured in years or months with the appropriate units specified using the "unit" attribute. Valid values for the "unit" attribute can be "y" for years and "m" for months.

In terms of the synch action 17, this command in the request 32, 35 can be processed by the command module 36 in order to make all of the domain expiry dates DEDs of the domains 14 of the bundle 13 have the same DED object 15 (i.e. representing the same date and thus deemed to be synchronized). It is recognised that the domain registration dates DRDs of the domain names 14 can be different, while their corresponding domain expiry dates DEDs could be the same (once synchronized).

Transaction Log/History 42

The registry databases 18 can also contain a transaction log/history 42 (e.g. EPP) containing all operations (a consequence of actions 17) executed on the objects 15 of the domain names 14 in the bundle 13, such that the log/history 42 indicates the domain name 14 by domain name ID along with details of the operation(s) (e.g. time of transaction, success of transaction, type of operation, etc.). It is recognised, as further described below, in the event that a domain name 14 of the bundle 13 is removed (e.g. divided from the bundle 13 as originally set up) and/or a new domain name 14 is added to the bundle 13 post creation of the original bundle 13, the transaction log/history of the new/deleted domain name 14 will be indicated by the original domain name ID pre-change (pre division or pre addition) as well as a new domain name ID (assigned post-change) cross referenced to the old ID. It is recognised that the log/history 42 can also contain the bundle ID assigned to the domain name 14 (representing the current bundle 13 or previous bundle 13 in the case of a change in bundle 13 membership). In this manner, it is recognised that a change in bundle 13 membership (e.g. added to a new bundle 13, switched from one bundle 13 to another bundle 13, or simply deleted from a current bundle 13) of a domain name 14 would be reflected in the change in value of the bundle ID 8 associated with that domain name 14 (e.g. from bundle ID=null to bundle ID=new#), as well as the change in domain name ID (e.g. from domain name ID=old# to domain name ID=new#). Accordingly, the transaction log/history 42 for a particular bundle 13 will contain the history of change in bundle membership for each of the changed domain names 14, in order for the registry operator 20 and/or registry services 22 being able to track all operations/results transacted on a particular domain name 14 from inception of the domain name 14.

Further, as further described below, in the event that a synchronization operation 36a,b is performed on member domain name(s) 14 of the bundle 13, the transaction log/history of the changed domain expiry date(s) DED(s) of the affected domain name(s) 14 will be indicated by the original domain expiry date(s) DED(s) pre-change (pre synchronization) as well as the new/changed domain expiry date(s) DED(s) (assigned post synchronization) cross referenced to the same domain name 14 (e.g. domain name ID). In this manner, it is recognised that a change in domain expiry date(s) DED(s) would be reflected in transaction history/log 42. Accordingly, the transaction log/history 42 for a particular bundle 13 will contain the history of change in domain expiry date DED synchronization for each of the affected domain names 14, in order for the registry operator 20 and/or registry services 22 being able to track all operations/results transacted on a particular domain name 14 from inception of the domain name 14.

It is recognised that the entities 16,18,20,22 can interact on the network 11 with one another in client server pairs. For example, the registrar 16 can be the EPP client and the registry database 18 (with associated registry operator 20) can be the paired EPP server. In general, an EPP server responds to a successful connection by returning a greeting to the client. The client waits for the greeting before sending an EPP command (i.e. action 17) to the server. EPP commands and responses are exchanged serially between the client and the server over the network 11, in order to affect the data contents of the corresponding objects 15 that are acted upon by the action 17 implemented by the server (i.e. as requested by the client). The server responds to each EPP command with a coordinated response that describes the results of processing the command.

EPP commands fall into three categories: session management commands, query commands, and data transform commands. Session management commands are used to establish and end sessions with an EPP server. Query commands are used to perform read-only, object-based information retrieval operations with respect to data contents of the objects 15. Transform commands are used to perform read-write object management operations with respect to the data contents of the objects 15.

EPP provides commands to manage sessions, retrieve object information, and perform transformation operations on objects. All EPP commands are atomic and idempotent, either succeeding completely or failing completely and producing predictable results in case of repeated execution. EPP provides three commands/actions to retrieve object information: action <info> to retrieve detailed information associated with a known object, action <ping> to determine if an object is known to the server, and action <transfer> to retrieve known object transfer status information. EPP can provide a number of commands/actions to transform (i.e. modify the data contents of the object 15) objects 15: action <create> to create an instance of an object 15 with a server, action <delete> to remove an instance of an object 15 from a server, action <renew> to extend the validity period of an object 15, action <update> to change information associated with an object 15, and action <transfer> to manage changes in client sponsorship (e.g. change in registrant 12) of a known object 15. As such, instance of an object 15 refers to the specific data contents of an object 15. EPP uses four decimal digits to describe the success or failure of each EPP command. The four digits of the reply each have special significance. The first digit denotes whether the response submitted by the server back to the client marks command success or failure. A client that wants to know approximately what kind of error occurred (command syntax error, security error, system error, etc.) can examine the second digit. The third and fourth digits are used to provide explicit information detail by the server to the client with respect to the results of command execution and object 15 data contents change thereby.

Referring to FIGS. 1 and 2, shown are the registry services provider 22 and/or registry operator 20 responsible for the generation, initial registration with the registrant 12 and maintenance of the plurality of domain names 14 aggregated into the domain name bundle 13. As noted, the domain names 14 of the domain name bundle 13 are stored in the registry database 18. The domain names 14 represent Internet 11 resources (e.g. web pages, databases, etc.) accessible via a specified URI (over the network 11) incorporating the domain name 14 associated with the specified TLD maintained in domain name registry database 18 using an appropriate network communications protocol (e.g. TCP/IP, HTTP, HTTPS, etc.). For example, the network 11 communications protocol includes rules for data formats for data exchange and rules for network address formats for data exchange that identify both the sender network 11 address and the intended receiver(s) network 11 address. In computing, the URI is a string of characters used to identify a name or a resource. Such identification enables interaction with representations of the resource over a network (typically the World Wide Web) using the specific protocols. Schemes specifying a concrete syntax and associated protocols define each URI, such that URIs can be classified as locators (URLs), as names (URNs), or as both. A uniform resource name (URN) functions like a person's name, while a uniform resource locator (URL) resembles that person's street address. In other words: the URN defines an item's identity, while the URL provides a method for finding the item over the network 11.

From the point of view of a registrant 12 to the domain name bundle 13, the objects 15 associated with each of the domain names 14 in the bundle 13 can be perceived by the registrant 12 as a synchronized set of objects 15, such that requested changes/adjustments to the data contents of one object 15 type (e.g. registrant contact name, expiration date, etc.) by the registrant 12 for one domain name 14 in the bundle 13 is rigorously mapped and executed to a corresponding same object 15 type for all other domain names 14 in the bundle 13 as a result of receiving the registrant 12 request (i.e. command/action). Execution of the action contained in the registrant 12 request, to affect the objects 15 stored in the registry database 18 associated with the domain names 14 of the bundle 13, can be executed by the registry operator 20 and/or the registry services provider 22. It is recognized that the registry services provider 22 can also function as a registry operator 20 for selected domain names 14.

It is recognized that each of the domain names 14 in the bundle 13 have their own group of associated objects 15, such that each group of objects 15 in the bundle 13 are combined into a set of objects 15 for the bundle 13. For example, for a bundle 13 having three domain names 14, the set of objects 15 would have three domain name (type) objects 15, three registrant contact (type) objects 15, three creation date (type) objects 15, etc, such that each group of associated objects 15 would have one domain name (type) object 15, one registrant contact (type) object 15, one creation date (type) object 15, etc.

The objective of bundle 13 is to provide a synchronized registration and maintenance platform for a plurality of domain names 14 contained in the bundle 13. As such, it is recognized that actions taken on one object type for a selected domain name 14 of the bundle 13 is rigorously executed on all other same object types in the set of objects of the bundle 13. For registries focused on organizational registrations, the registry services provider 22 can offer effective and significant brand protection to registrant 12 (e.g. organization) of domain names 14 in the bundle 13. This is especially valuable to small and medium sized organizations, as well as organizations with limited resources to develop and manage a brand.

It is recognized that the registry services provider 22 provides or otherwise hosts the web pages made available to users of the network 11, in order to provide access to web-published content associated with the domain name of interest sought by the network user. For example, the web pages and associated content can be provided to the network 11 by the registry services provider 22 as files uploaded via File Transfer Protocol (FTP) or a Web interface of the network 11 (e.g. the Internet). The files representing the web pages can be delivered to the Web "as is" or with some processing. The web page(s) 24 for a domain name registrant 12 (e.g. domain owner) can be provided as a single page hosted or as a more complex series of pages and associated navigational links between the pages supported via the database and application development platforms (e.g. PHP, Java, Ruby on Rails, ColdFusion, or ASP.NET). However, it is recognized that the application development platforms, when pertaining to content of their web pages, inhibits the domain name registrant 12 (e.g. domain owner) from writing or installing scripts for applications like forums and content management published on the web pages, as further described below. As such, the registry services provider 22, for any content published on the web pages, provides none or limited interfaces or control panels to the domain name registrant 12 (e.g. domain owner) for managing the Web server and installing scripts, as well as other modules and service applications like e-mail, as the bundle 13 is perceived by the registrant 12 as facilitating and streamlining registration/maintenance of all of the domain names 14 in the bundle 13.

Further, it is recognized that registry services provider 22 can be embodied as separate from registry operator 20 (e.g. a third party cooperating with registry operator 20 via the network 11) or can be embodied as a service hosted (not shown) by registry operator 20 itself, as desired. Registry services provider 22 can be used to generate and maintain the bundle 13 on command/registration information 15*a,b, c,d* obtained from the registrant 12 directed to the registry operator 20 and/or registry services provider 22, as received via a registration module 30 as a registration request 32.

Example content of registration information 15*a,b,c,d* can include several pieces of information connected with the domain names 14 of the bundle 13, for example: 1) administrative contact information 15*a* (e.g. contact name, address, etc.) defining a designated an administrative contact to manage the domain names 14 as the bundle 13 including management of all business information, such as name of record, postal address, and contact information of the official registrant of the domain names 14 as the bundle 13 and the obligation to conform to the requirements of the domain registry operator 20 in order to retain the right to use the domain names 14 as the bundle 13, as well as installing additional contact information for technical and billing functions; 2) technical contact information 15*b* (e.g. contact name, address, etc.) defining a designated technical contact to manage the name server of the domain names 14 as the bundle 13 including assuring conformance of the configurations of the domain names 14 as the bundle 13 with the requirements of the domain registry service operator 20, maintaining the domain zone records, and providing continuous functionality of the name server (that leads to the accessibility of the domain names 14 as the bundle 13); 3) billing contact information 15c (e.g. contact name, address, etc.) defining a designated party responsible for receiving billing invoices from the domain name registrar 16 and paying applicable fees; and 4) name server information 15d (e.g. a hostname and the corresponding IP address or just the hostname, which must be resolvable either in the new domain names 14 as the bundle 13, or exist elsewhere) defining designated name server as part of the registration service, for example registrant 12 can specify its own authoritative name server to host the domain's resource records of the domain names 14 as the bundle 13. As registrant information 15a,b,c,d is received, it is provided to a bundle generation module 40 for use in generating the bundle 13 via population of all of the objects 15 contained in the set of bundle objects 15.

Referring again to FIG. 2, the registry operator 20 and/or registry services provider 22 can also have a command execution module 36 (provided as separate from the registration module 30 by example only). The command execution module 36 is configured to receive the actions from the registrant 12 in order to update the data contents of all of the related objects 15 (e.g. of the same type) contained in the set of bundle objects 15. For example, a command to update registrant contact details for one of the domain names (e.g. specified by domain name ID in the command) is executed by the command execution module 36 to affect the data contents of the relevant object 15 in the registry database 18 for the specified domain name 14, as well as similarly to affect the data contents of the relevant objects 15 in the registry database 18 for all other domain names 14 in the bundle 13 to which the specified domain name 14 belongs.

Example Registration of the Bundle 13

An example operation of the registration module 30 is as follows, referring to FIGS. 1 and 2, synchronizing registration of a plurality of domain names 14 in a Domain Name System (DNS) can be implemented by the registry operator 20 and/or registry services provider 22 by: receiving a request 32 by the registration module 30 from a domain name registrant 12 for an action as a registration operation on an object 15 unique to a domain name 14 of the DNS, the domain name 14 having synchronized objects 15 with another domain name 14 being stored as a domain name bundle 13 including the domain name 14 in a domain name database 18; changing the object 15 by the generation module 40 in the domain name database 18 according to the action; identifying the another domain name 14 in the domain name bundle 13 by inspecting a list of domain names contained in the bundle 13; requesting a change to a corresponding object 15 to the object 15 for the another domain name 14 with the action in order to propagate the registration operation performed on the object 15 to the corresponding object 15, the corresponding object 15 being unique to the another domain name 14; and forwarding via the registration module 30 a reported result 34 of the action to the domain name registrant 12, the object 15 and the corresponding object 15 representing the synchronized objects 15 by having the same parameter value, an owner to all domain names 14 in the domain name bundle 13 being the domain name registrant 12.

A further example operation of the registration module 30 is as follows, referring to FIGS. 1 and 2: receiving a subsequent request 32 from the domain name registrant 12 for a subsequent action as a subsequent registration operation on the object 15 unique to the domain name 14 of the DNS; changing the object 15 in the domain name database 18 according to the subsequent action; identifying the another domain name 15 in the domain name bundle 13; requesting a subsequent change to the corresponding object 15 for the another domain name 14 with the subsequent action in order to propagate the subsequent registration operation performed on the object 15 to the corresponding object 15; and forwarding a reported result 34 of the subsequent action to the domain name registrant 12.

A further example operation of the registration module 30 is as follows, referring to FIGS. 1 and 2: receiving a subsequent request 32 from the domain name registrant 12 for a subsequent action as a subsequent registration operation on a different object 15 unique to the domain name 14 of the DNS; changing the different object 15 in the domain name database 18 according to the subsequent action; identifying the another domain name 14 in the domain name bundle 13; requesting a subsequent change to the corresponding different object 15 for the another domain name 14 with the subsequent action in order to propagate the subsequent registration operation performed on the different object 15 to the corresponding different object 15; and forwarding a reported result 34 of the subsequent action to the domain name registrant 12.

A further example operation of the registration module 30 is as follows, referring to FIGS. 1 and 2: receiving a subsequent request 32 from the domain name registrant 12 for a subsequent action as a subsequent registration operation on the corresponding object 15 unique to the another domain name 14 of the DNS; changing the corresponding object 15 in the domain name database 18 according to the subsequent action; identifying the domain name 14 in the domain name bundle 13; requesting a subsequent change to the object 15 for the domain name 14 with the subsequent action in order to propagate the subsequent operation performed on the corresponding object 15 to the object 15; and forwarding a reported result 34 of the subsequent action to the domain name registrant 12.

A further example operation of the registration module 30 is as follows, referring to FIGS. 1 and 2: receiving a subsequent request 32 from the domain name registrant 12 for a subsequent action as a subsequent registration operation on a different corresponding object 15 unique to the another domain name 14 of the DNS; changing the corresponding different object 15 in the domain name database 18 according to the subsequent action; identifying the domain name 14 in the domain name bundle 13; requesting a subsequent change to a different object 15 for the domain name 14 with the subsequent action in order to propagate the subsequent operation performed on the corresponding different object 15 to the different object 15; and forwarding a reported result 34 of the subsequent action to the domain name registrant 12.

As discussed above, registry databases 18 can also contain the transaction log/history 42 containing all operations (a consequence of actions) executed on the objects 15 of the domain names 14 in the bundle 13, such that the log/history 42 indicates the domain name 14 by domain name ID along with details of the operation(s) (e.g. time of transaction, success of transaction, type of operation, etc.). In the event that a domain name 14 of the bundle 13 is removed (e.g. divided from the bundle 13 as originally set up) and/or a new domain name 14 is added to the bundle 13 post creation of the original bundle 13, the transaction log/history of the new/deleted domain name 14 will be indicated by the original domain name ID pre-change (pre division or pre addition) as well as a new domain name ID (assigned post-change) cross referenced to the old ID. It is recognised that the log/history 42 can also contain the bundle ID assigned to the domain name 14 (representing the current bundle 13 or previous bundle 13 in the case of a change in bundle 13 membership).

Example Adding of Domain Name 14 to the Bundle 13

In terms of adding a new domain name to an existing bundle 13, the registration module 30 operates as follows, referring to FIGS. 1 and 2: receiving a subsequent request 32 from the domain name registrant 12 to add a specified domain name 14 to the existing bundle 13. As such, the registration module 30 (for example via the generation module 40) would update all of the objects of the new domain name 14 with the data contents of all of the synchronized objects 15 already in existence for the bundle 13 (receiving membership of the new domain name 14). As mentioned, the mention of the new domain name 14 in the transaction log 42 would be assigned a new ID (e.g. domain name ID, bundle ID 8) to replace the current ID of the domain name 14 in the transaction log 42, thereby reflecting the change in bundle 13 membership of the new domain name 14. It is recognised that in the case of adding the new domain name 14 to the bundle 13, it is feasible that some of the object 15 types may not be synchronized, for example the new domain name 14 can have a different creation date (creation data object 15 type) than the rest of the pre-existing domain names 14 of the bundle 13 or for example the new domain name 14 can have a different renewal date (renewal data object 15 type) than the rest of the pre-existing domain names 14 of the bundle 13. However, irrespective that some of the object 15 types in the set of bundle objects 15 can be unsynchronized, the owner (owner object 15 type) and contact details (registrant contact detail object 15 type) are synchronized for all associated objects 15 by same type in the set of bundle objects 15. It is recognised as well that the list 9 of domain names 14 would be updated with the new domain name ID and the new domain name 14 would assume the bundle ID 8 of the current bundle 13 to reflect change in bundle 13 membership.

Example Deleting of Domain Name 14 from the Bundle 13

In terms of deleting a domain name 14 from an existing bundle 13, the registration module 30 operates as follows, referring to FIGS. 1 and 2: receiving a subsequent request 32 from the domain name registrant 12 to delete a specified domain name 14 from the existing bundle 13. As such, the registration module 30 (for example via the generation module 40) would the delete all of the objects 15 of the delete domain name 14 of the data contents from the synchronized objects 15 already in existence for the bundle 13 (losing membership of the delete domain name 14). As mentioned, the mention of the delete domain name 14 in the transaction log 42 would be assigned a new ID (e.g. domain name ID, new bundle ID 8 if appropriate) to replace the current ID (e.g. delete current bundle ID 8 if appropriate) of the delete domain name 14 in the transaction log 42, thereby reflecting the loss in bundle 13 membership of the delete domain name 14. It is recognised that in the case of deleting the delete domain name 14 from the bundle 13, all of the objects for the delete domain name 14 would be duplicated in the registry and assigned appropriate data contents to reflect loss of membership in the old bundle 13. It is feasible that some of the object 15 types may remain populated by data as inherited when first incorporated into the old bundle 13, for example the delete domain name 14 can retain its creation date (creation data object 15 type) of the rest of the pre-existing domain names 14 of the bundle 13 or for example the delete domain name 14 can retain its renewal date (renewal data object 15 type) of the rest of the pre-existing domain names 14 of the bundle 13. However, irrespective that some of the object 15 types can remain similar to the domain names 14 of the old bundle 13, the owner (owner object 15 type) and contact details (registrant contact detail object 15 type) would be changed for the associated objects 15 of the delete domain name 14. It is recognised as well that the list 9 of domain names 14 would be updated with the loss of the delete domain name ID and the delete domain name 14 would lose the bundle ID 8 of the old bundle 13 to reflect change in bundle 13 membership.

Example Domain Expiry Date DED Synchronization of the Bundle 13

Figure 3:
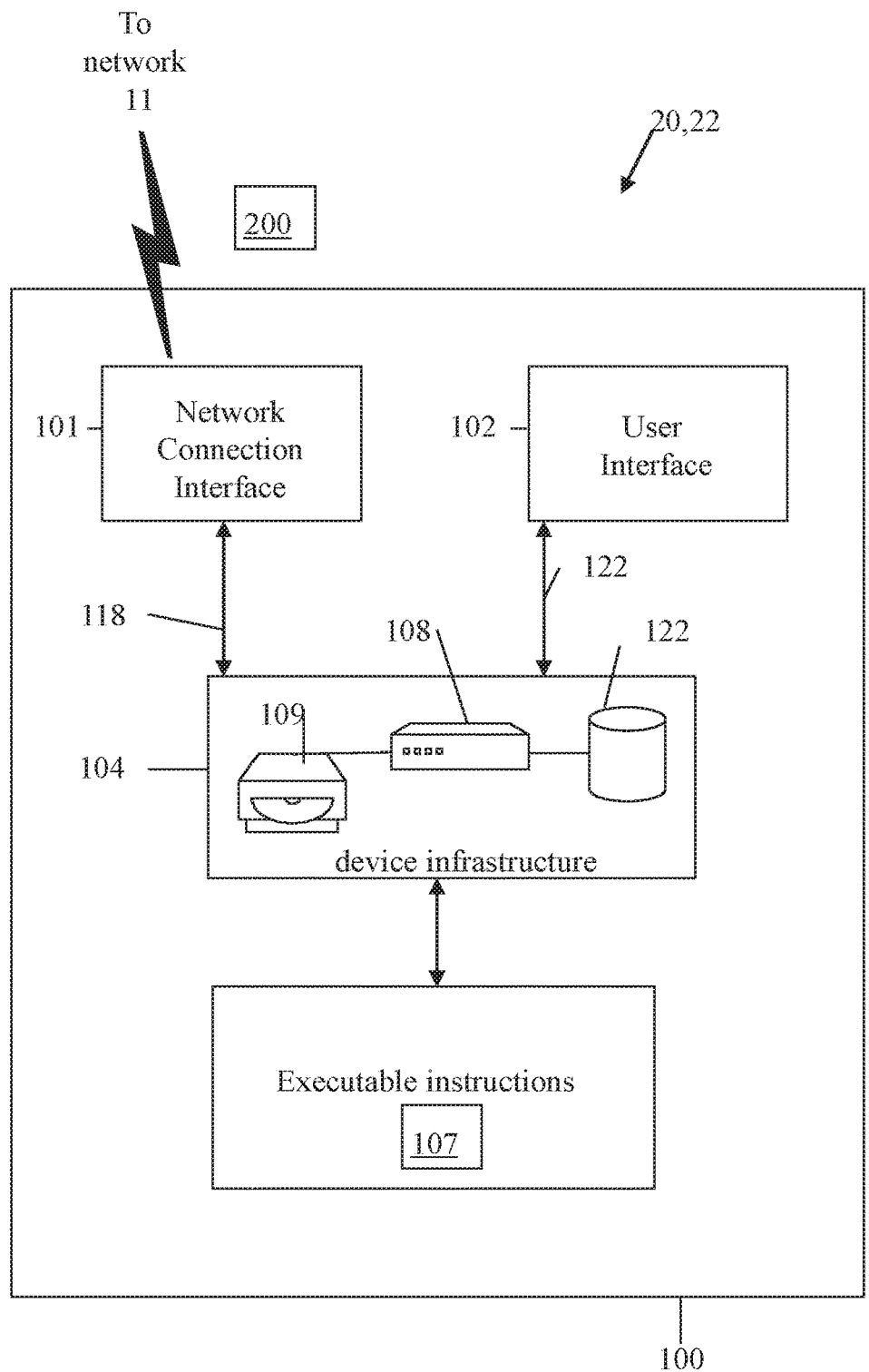
FIG. 3 is an example configuration of a computer device hosting the client or server devices utilized in FIG. 2.
Figure 5:
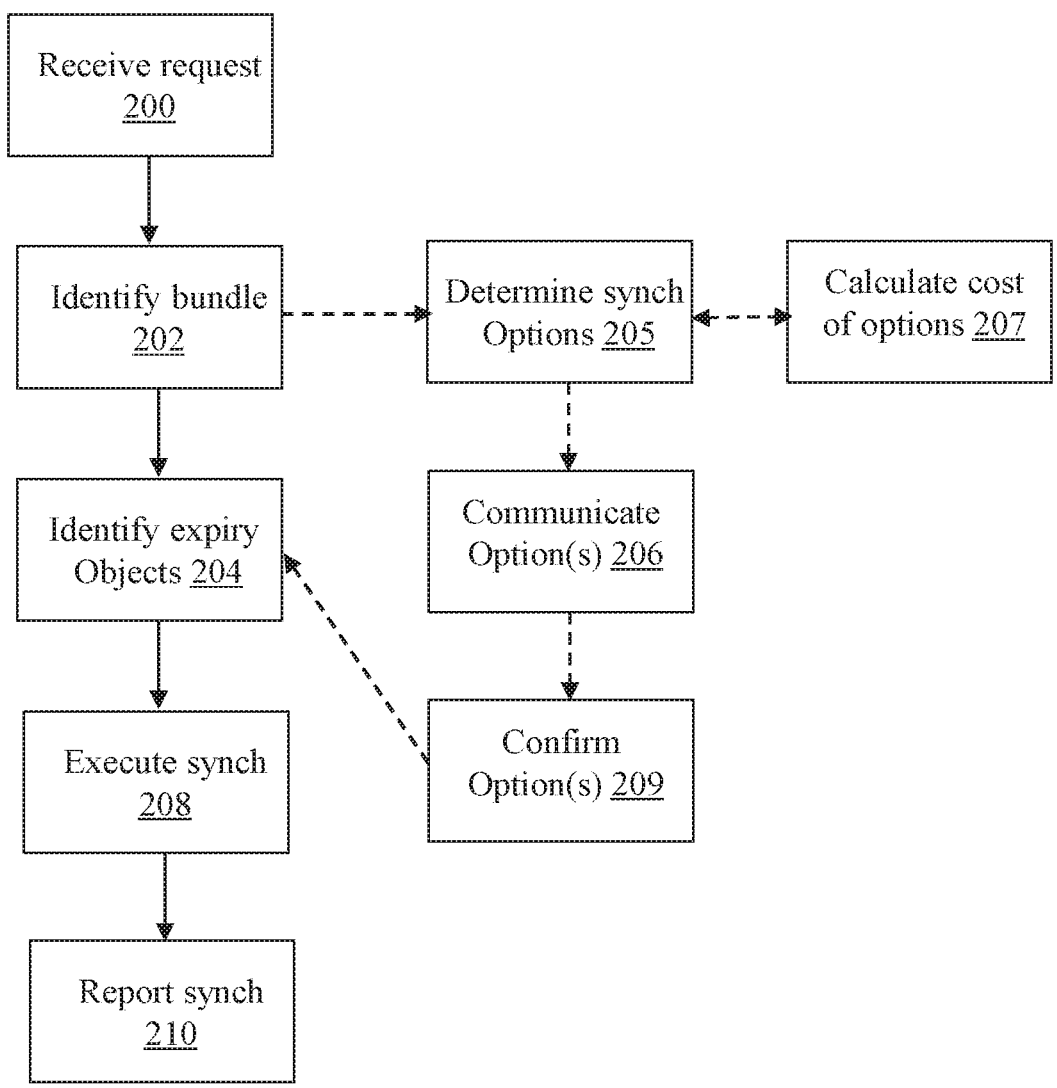
FIG. 5 is an example operation of the system of FIG. 1.

For example, referring to FIGS. 3, 4 and 5, the command module 36 receives 200 the request 35 containing a synch 17 action and identifying at least one of the domain names 14 of the bundle 13 and/or the bundle ID 8. The command module 36 can use the domain name 14 and/or the bundle ID 8 to identify 202 the bundle 13 and in particular a list 9 (of the bundle 13) of the domain names 14 as members of the bundle 13. The command module 36 can identify 204 the domain expiry date DED (e.g. object 15) for each of the domain names 14 of the bundle 13 and to optionally determine 205 the synchronization option(s)/operation(s) available for the domain names 14 of the bundle 13.

One synchronization operation 36a would be a backwards synchronization, i.e. to select a synchronization date (e.g. one of the domain expiry date DED of a domain name 14 of the bundle 13) that is earlier than one or more of the other domain expiry dates DEDs of the bundle 13 as part of step 204. In this manner, this potential synchronization operation 36a could be optionally communicated 206 to the registrar 16 and/or registrant 12 as a response 34, for example detailing the backwards synchronization operation 36a and the identified (earlier) domain expiry date DED that would be used as a date to change all of the other domain expiry date DED of the domain names 14 of the bundle 13. This potential change would be to effectively subtract existing term from each of the other domain name expiry dates DEDs so that then all of the domain name expiry dates DEDs for the bundle 13 would be synchronized, i.e. the same as the selected synchronization date. In other words, the value of the domain expiry date DED for each of the synchronized domain names 14 would updated from the later date(s) to the selected earlier synchronization date.

Another synchronization operation 36b would be a forwards synchronization, i.e. to select a synchronization date (e.g. one of the domain expiry date DED of a domain name 14 of the bundle 13) that is later than one or more of the other domain expiry dates DEDs of the bundle 13 as part of step 204. In this manner, this potential synchronization operation 36a could be optionally communicated 206 to the registrar 16 and/or registrant 12 as a response 34, for example detailing the forwards synchronization operation 36b and the identified (later) domain expiry date DED that would be used as a date to change all of the other domain expiry date DED of the domain names 14 of the bundle 13. This potential change would be to effectively add existing term to each of the other domain name expiry dates DEDs so that then all of the domain name expiry dates DEDs for the bundle 13 would be synchronized, i.e. the same as the selected synchronization date. In other words, the value of the domain expiry date DED for each of the synchronized domain names 14 would updated from the earlier date(s) to the selected later synchronization date.

Accordingly, the synchronization response 34 provided 206 to the registrar 16 and/or registrant 12 could; contain details of potential synchronization operation 36a, contain details of potential synchronization operation 36b, or contain details of potential synchronization operations 36a and 36b.

In terms of determining which synchronization operation 36a, 36b to do, a synchronization criteria 36c could be optionally used to calculate 207 a cost effectiveness of the particular synchronization operation 36a,b (as performed by the command module 36).

For example, in the case where identified is a backwards synchronization, i.e. a synchronization date (e.g. one of the domain expiry date DED of a domain name 14 of the bundle 13) that is earlier than one or more of the other domain expiry dates DEDs of the bundle 13. The command module 36 could calculate 207 the amount of term being lost for each of the domain names 14 having their domain expiry date DED brought backwards in time and to then determine an aggregate cost associated with the total term lost for the domain names 14 of the bundle 13, should the backwards synchronization operation 36a be performed. For example, where a year of domain name 14 term costs $10, and the aggregate term lost for the domain names 14 of the bundle 13 is 3.4 years, then the deemed cost for proceeding with the backwards synchronization operation 36a would be $34. In other words, the registrar 16 and/or registrant 12 would lose this amount of aggregate term (for the affected domain names 14) upon synchronization, realizing that the lost aggregate term has already been paid for by the registrant 12 and thus is a non refundable cost to the registrant 12 of the backwards synchronization operation 36a. It is also recognizable that the aggregate term, as calculated, could be a refundable cost that could be reimbursed to the registrant 12 as part of the implementation of the backwards synchronization operation 36a.

Similarly, in the case where identified is a forwards synchronization, i.e. a synchronization date (e.g. one of the domain expiry date DED of a domain name 14 of the bundle 13) that is later than one or more of the other domain expiry dates DEDs of the bundle 13. The command module 36 could optionally calculate 207 the amount of term being gained for each of the domain names 14 having their domain expiry date DED brought forwards in time and to then determine an aggregate cost associated with the total term gained for the domain names 14 of the bundle 13, should the forwards synchronization operation 36a be performed. For example, where a year of domain name 14 term costs $10, and the aggregate term gained for the domain names 14 of the bundle 13 is 3.8 years, then the deemed cost for proceeding with the forwards synchronization operation 36b would be $38. In other words, the registrar 16 and/or registrant 12 would gain this amount of aggregate term (for the affected domain names 14) upon synchronization, realizing that the gained aggregate term would have to be paid for by the registrant 12 and thus is a cost to the registrant 12 of the forwards synchronization operation 36b.

In the two cases above, for example where both are refundable or where both are non refundable, the command module 36 could compare (as part of the calculation 207) the backwards synchronization operation 36a cost with the forwards synchronization operation 36b cost and select the lower cost option 36a, 36b (e.g. include only one option 36a or 36b) to be provided in the response 34 communicated 206 to the registrar 16 and/or registrant 12. Alternatively, the command module 36 could communicate 206 both options 36a,b along with their respective synchronization costs and then let the registrar 16 and/or registrant 12 decide which option 36a, 36b to choose. For example, if the backwards synchronization operation 36a has a cost of $10 (e.g. non-refundable) for the respective aggregate term and the forwards synchronization operation 36b has a cost of $15 (e.g. non-refundable) for the respective aggregate term, then the registrant 12 may choose the lower cost option of the backwards synchronization operation 36a, as the registrant 12 would only lose $10 verses $15. Alternatively, if the backwards synchronization operation 36a has a cost of $10 (e.g. refundable) for the respective aggregate term and the forwards synchronization operation 36b has a cost of $15 (e.g. refundable) for the respective aggregate term, then the registrant 12 may choose the lower cost option of the forwards synchronization operation 36b, as the registrant 12 would gain $15 verses $10.

In any event, based on the synchronization request 35, the command module 36 could simply receive the request 35 and implement 208 the synchronization operation 36a, 36b. Alternatively, the command module 36 could communicate 206 the details of the synchronization operation 36a, 36a (i.e. a single operation 36a, a single operation 36b, or both operations 36a,b) and then receive confirmation 209 (e.g. including payment for the synchronization operation 36a,b, if applicable) of the potential operation 36a (or 36b in the case of a plurality of operations 36a,b provided in the communication 206) from the registrar 16 and/or registrant 12. Once confirmed, then the command module 36 could implement 208 the synchronization operation 36a, 36b.

Once implemented 208, the command module 36 could then report 210 details of the synchronization operation 36a,b performed. For example, the command module 36 could provide details of all the domain names 14 in the bundle 13 now having the same domain expiry dates DEDs, as well as identifying the now synchronized value of the domain expiry date DED.

It is recognised that the synchronization of the domain expiry dates DEDs for the domain names 14 of the bundle 13 can be performed based on a number of different bundle 13 membership scenarios, namely the domain expiry dates DEDs synchronization can be done as: 1) part of the steps in creation of the bundle 13 (i.e. creating a bundle 13 with assigned bundle ID 8 to contain a number of specified domain names 14); 2) part of the steps when a new domain name 14 is added to an existing bundle 13; part of the steps when a domain name 14 of an existing bundle 13 is removed from the bundle 13; and/or a step for the existing domain names 14 (already members) of an existing bundle 13.

In the case where the bundle 13 is created, i.e. a selected set of domain names 14 are requested 32, 35 (e.g. as part of a bundle 13 creation request) by the registrant 12 and/or registrar 16, the command module 36 could create the bundle 13 as a step prior to step 204 of FIG. 5 and then proceed to steps 204-210 in order to effect the domain expiry date DED synchronization as described above.

In the case where a domain name is added to an existing bundle 13, i.e. a domain name 14 is requested 32, 35 to be added (by the registrant 12 and/or registrar 16, the command module 36 could add the new domain name 14 to the existing bundle 13 as a step prior to step 204 of FIG. 5 and then proceed to steps 204-210 in order to effect the domain expiry date DED synchronization as described above. In this case, it is recognised that the domain expiry date DED of the newly added domain name 14 could affect the actual selected synchronization date performed in step 204, which can then be used to calculate the aggregated cost of the synchronization operation 36a,b.

In the case where a domain name is removed from an existing bundle 13, i.e. a domain name 14 is requested 32, 35 to be removed (by the registrant 12 and/or registrar 16, the command module 36 could remove the new domain name 14 from the existing bundle 13 as a step prior to step 204 of FIG. 5 and then proceed to steps 204-210 in order to effect the domain expiry date DED synchronization as described above. In this case, it is recognised that the domain expiry date DED of the newly removed domain name 14 could affect the actual selected synchronization date performed in step 204, which can then be used to calculate the aggregated cost of the synchronization operation 36a,b.

Figure 6:
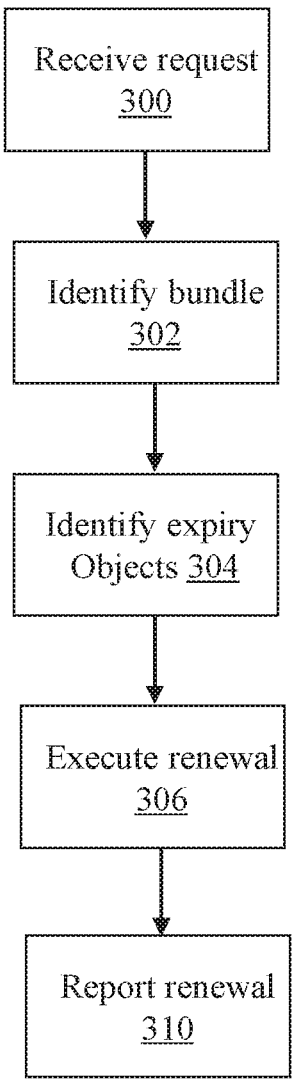
FIG. 6 is a further example operation of the system of FIG. 1.

Accordingly, once synchronization of the domain expiry dates DEDs is completed, then subsequent renewal 17 actions on the bundle 13 can be straightforwardly executed, as all of the domain names 14 of the bundle 13 have the same synchronized domain expiry date DED. In this way as shown in FIG. 6, for renewal 17 actions subsequent to the synchronization of domain expiry date DED, the command module 36 can receive 300 the request 35 containing a renewal 17 action and identifying at least one of the domain names 14 of the bundle 13 and/or the bundle ID 8. The command module 36 can use the domain name 14 and/or the bundle ID 8 to identify 302 the bundle 13 and in particular a list 9 (of the bundle 13) of the domain names 14 as members of the bundle 13. The command module 36 can identify 304 the domain expiry date DED (e.g. object 15) for each of the domain names 14 of the bundle 13 and to update 306 (i.e. renew) and report 310 the domain expiry date DED for each of the domain names 14 of the bundle 13. Accordingly, once synchronized for the domain expiry date DED, then the subsequent renewal process for a plurality of domain names 14 of the bundle 13 is then advantageously simplified.

Further Example Operations of the Command Module 36

An example operation of the command module 36 is as follows, referring to FIGS. 1 and 2, synchronizing management of a plurality of domain names 14 in a Domain Name System (DNS) can be implemented by the registry operator 20 and/or registry services provider 22 by: receiving a management request 35 from a domain name registrant 12 for an action as a maintenance operation on an object 15 unique to a domain name 14 of the DNS, the domain name 14 having synchronized objects 15 with another domain name 14 being stored as a domain name bundle 13 including the domain name 14 in a domain name database 18; changing the object 15 by the command module 36 in the domain name database 18 according to the action; identifying the another domain name 14 in the domain name bundle 13 by inspecting a list of domain names contained in the bundle 13; requesting a change to a corresponding object 15 to the object 15 for the another domain name 14 with the action in order to propagate the registration operation performed on the object 15 to the corresponding object 15, the corresponding object 15 being unique to the another domain name 14; and forwarding a reported result 34 of the action to the domain name registrant 12, the object 15 and the corresponding object 15 representing the synchronized objects 15 by having the same parameter value, an owner to all domain names 14 in the domain name bundle 13 being the domain name registrant 12. The management request 35 can include an action 17 such as a synchronization 17 action. The management request 35 can include an action 17 such as a renew 17 action.

A further example operation of the command module 36 is as follows, referring to FIGS. 1 and 2: receiving a subsequent request 35 from the domain name registrant 12 for a subsequent action as a subsequent maintenance operation on the object 15 unique to the domain name 14 of the DNS; changing the object 15 in the domain name database 18 according to the subsequent action; identifying the another domain name 14 in the domain name bundle 13; requesting a subsequent change to the corresponding object 15 for the another domain name 14 with the subsequent action in order to propagate the subsequent registration operation performed on the object 15 to the corresponding object 15; and forwarding a reported result 34 of the subsequent action to the domain name registrant 12. The subsequent request 35 can include an action 17 such as a synchronization 17 action. The subsequent request 35 can include an action 17 such as a renew 17 action.

A further example operation of the command module 36 is as follows, referring to FIGS. 1 and 2: receive a subsequent request 35 from the domain name registrant 12 for a subsequent action as a subsequent maintenance operation on a different object 15 unique to the domain name 14 of the DNS; changing the different object 15 in the domain name database 18 according to the subsequent action; identifying the another domain name 14 in the domain name bundle 13; requesting a subsequent change to the corresponding different object 15 for the another domain name 14 with the subsequent action in order to propagate the subsequent maintenance operation performed on the different object 15 to the corresponding different object 15; and forwarding a reported result 34 of the subsequent action to the domain name registrant 12. The subsequent request 35 can include an action 17 such as a synchronization 17 action. The subsequent request 35 can include an action 17 such as a renew 17 action.

A further example operation of the command module 36 is as follows, referring to FIGS. 1 and 2: receiving a subsequent request 35 from the domain name registrant 12 for a subsequent action as a subsequent maintenance operation on the corresponding object 15 unique to the another domain name 14 of the DNS; changing the corresponding object 15 in the domain name database 18 according to the subsequent action; identifying the domain name 14 in the domain name bundle 13; requesting a subsequent change to the object 15 for the domain name 14 with the subsequent action in order to propagate the subsequent operation performed on the corresponding object 15 to the object 15; and forwarding a reported result 34 of the subsequent action to the domain name registrant 12. The subsequent request 35 can include an action 17 such as a synchronization 17 action. The subsequent request 35 can include an action 17 such as a renew 17 action.

A further example operation of the command module 36 is as follows, referring to FIGS. 1 and 2: receiving a subsequent request 35 from the domain name registrant 12 for a subsequent action as a subsequent maintenance operation on a different corresponding object 15 unique to the another domain name 14 of the DNS; changing the corresponding different object 15 in the domain name database 18 according to the subsequent action; identifying the domain name 14 in the domain name bundle 13; requesting a subsequent change to a different object 15 for the domain name 14 with the subsequent action in order to propagate the subsequent operation performed on the corresponding different object 15 to the different object 15; and forwarding a reported result 34 of the subsequent action to the domain name registrant 12. The subsequent request 35 can include an action 17 such as a synchronization 17 action. The subsequent request 35 can include an action 17 such as a renew 17 action.

It is recognised that one of the maintenance operations could be updating the objects 15 in the object set to reflect a change in registrar 14 of the bundle 13 and all domain names 14 contained therein.

The action can be implementing actions on all domain names 14 of the domain name bundle 13 owned by the domain name registrant 12, for example actions such as check, info/status, update/mod, delete/del, transfer, renew, synchronization. It is recognised that all domain names 14 of the domain name bundle 13 can be stored in the domain name database 18 of a common registry 20. It is recognised that all domain names 14 of the domain name bundle 13 can be associated with a common registrar 16. Further, the forwarded result 34 can include details on the synchronized objects 15 for the domain name 14 and the another domain name 14.

Further, it is recognized that any of the domain names 14 of the bundle 13 can be identified in the request 32, 35 in order to affect all domain names 14 in the bundle 13.

In view of the above descriptions of storage 18 for the computer devices 100 (see FIG. 3) of registry operator 20 and service 22, storage 18 can be configured as keeping the stored data (e.g. objects 15, lists 8,9) in order and the principal (or only) operations on the stored data are the addition/amendment of or removal of the stored data from storage 18 (e.g. FIFO, FIAO, etc.). For example, storage 18 can be a linear data structure for containing and subsequent accessing of the stored data and/or can be a non-linear data structure for containing and subsequent accessing of the stored data.

Further, storage 18 receives various entities such as data that are stored and held to be processed later. In these contexts, storage 18 can perform the function of a buffer, which is a region of memory used to temporarily hold data while it is being moved from one place to another (i.e. between the between computer devices 100). Typically, the data is stored in the memory when moving the data between processes within/between one or more computers. It is recognised that storage 18 can be implemented in hardware, software, or a combination thereof. The storage 18 is used in the network system 10 when there is a difference between the rate/time at which data is received and the rate/time at which the data can be processed (e.g. ultimately by the devices 100).

Further, it will be understood by a person skilled in the art that memory/storage 18 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 18 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 18 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 18 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server (acting as a client or as a server of a classic client-server relationship), it is recognised that the computer devices 100 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 11. The computer devices 100 implementing functionality of registry operator 20 and service 22 can provide specialized services across the network 11, for example to private users inside a large organization or to public users via the Internet 11. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 11 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Referring to FIG. 3, a computing device 100 implementing functionality of registry operator 20 and service 22 can include a network connection interface 101, such as a network interface card or a modem, coupled via connection 118 to a device infrastructure 104. The connection interface 101 is connectable during operation of the devices to the network 11 (e.g. an intranet and/or an extranet such as the Internet), which enables the devices to communicate with each other as appropriate. The network 11 can support the communication of the communications 20, 26, 32, 34, 35, and the related content.

Referring again to FIG. 3, the device 100 can also have a user interface 102, coupled to the device infrastructure 104, to interact with a user (e.g. server administrator—not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 3, operation of the device 100 is facilitated by the device infrastructure 104. The device infrastructure 104 includes one or more computer processors 108 and can include an associated memory 122 (e.g. memory 18). The computer processor 108 facilitates performance of the device 100 configured for the intended task (e.g. of the respective module(s) 30,36,40 of service 22, operator 20) through operation of the network interface 101, the user interface 102 and other application programs/hardware of the device 100 by executing task related instructions. These task related instructions can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium 109 coupled to the processor 108 for providing instructions to the processor 108 and/or to load/update the instructions 107 (e.g. modules 30,36,40). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine readable instructions for implementing predetermined functions/operations including those of an operating system and the modules, for example. The processor 108 as used herein is a configured device and/or set of machine-readable instructions for performing operations as described by example above, including those operations as performed by any or all of the modules 30,36,40. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the service 22 and/or operator 20 can include one or more of the computing devices 100 (comprising hardware and/or software) for implementing the modules, as desired.

It will be understood in view of the above that the computing devices 100 may be, although depicted as a single computer system, may be implemented as a network of computer processors, as desired.

What is claimed is:

1. A method for synchronizing management of a plurality of domain names in a Domain Name System (DNS), the method comprising the steps of:
receive a synchronization request for synchronizing a first object related to a first renewal date of a first domain name with a second object related to a second renewal date of a second domain name, the first object unique to the first domain name and the second object unique to the second domain name, the first object and the second object stored in a domain name database and the second domain name associated with a domain name bundle, the synchronization request including an explicit identifier only of the first domain name but not of the second domain name;
use a bundle identifier of the domain name bundle associated with the explicit identifier of the first domain name to access a domain name list of the domain name bundle in order to identify the second domain name;
locate both the first object and the second object in the domain name database;
determine a renewal date which is earlier than at least one of the first renewal date and the second renewal date;
synchronize as a backwards synchronization operation the first object and the second object to both have said renewal date, such that both the first domain name and the second domain name are configured to expire on said renewal date; and
send a synchronization response confirming the synchronization request.

2. The method of claim 1, wherein the synchronization request also includes the bundle identifier.

3. The method of claim 1, wherein said renewal date is the first renewal date, such that changing of the second object to said renewal date results in a loss of preexisting term for the second domain name.

4. The method of claim 1, wherein said renewal date is the second renewal date, such that changing of the first object to said renewal date results in a loss of preexisting term for the first domain name.

5. The method of claim 1, wherein the first object and the second object are domain expiry date objects.

6. The method of claim 1, wherein the first domain name is an existing member of the domain name bundle.

7. The method of claim 1, wherein the second domain name is an existing member of the domain name bundle.

8. The method of claim 1, wherein the first domain name is a requested new member of the domain name bundle.

9. The method of claim 1, wherein the second domain name is a requested new member of the domain name bundle.

10. The method of claim 1, wherein the first domain name and the second domain names are requested new members of the domain name bundle.

11. The method of claim 1, wherein the first domain name and the second domain names are existing members of the domain name bundle.

12. The method of claim 1 further comprising the step of calculating a backwards aggregate cost of the backwards synchronization operation and a forwards aggregate cost of a forwards synchronization operation, the forwards aggregate cost using said renewal date as a date later than the at least one of the first renewal date and the second renewal date, such that the backwards aggregate cost is less than the forwards aggregate cost.

13. The method of claim 12 further comprising the steps of:
sending the backwards aggregate cost and the forwards aggregate cost to a sender of the synchronization request; and
receiving from the sender a confirmation of the backwards synchronization operation using said renewal date as said earlier.

14. The method of claim 1 further comprising the steps of:
calculating a backwards aggregate cost of the backwards synchronization operation;
sending the backwards aggregate cost to a sender of the synchronization request; and
receiving from the sender a confirmation of the backwards synchronization operation using said renewal date as said earlier.

15. The method of claim 1, wherein a first registration object related to a first registration date of the first domain name and a second registration object related to a second registration date of the second domain name have different values.

16. The method of claim 1 further comprising the steps of:
receive a renewal request as a subsequent operation on the first domain name, the renewal request associated with a new expiry date, the renewal request including an explicit identifier only of the first domain name but not of the second domain name;
change the first object in the domain name database by replacing said renewal date with the new expiry date;
identify the second domain name as the existing member in the domain name bundle;
change the second object in the domain name database by replacing said renewal date with the new expiry date; and
forward a reported result of the renewal request.

17. A method for synchronizing management of a plurality of domain names in a Domain Name System (DNS), the method comprising the steps of:
receive a synchronization request for synchronizing a first object related to a first renewal date of a first domain name with a second object related to a second renewal date of a second domain name, the first object unique to the first domain name and the second object unique to the second domain name, the first object and the second object stored in a domain name database and the second domain name being an existing member of a domain name bundle, the synchronization request including an explicit identifier of the domain name bundle but not of first domain name nor of the second domain name;
use the explicit identifier as a bundle identifier of the domain name bundle associated to access a domain name list of the domain name bundle in order to identify the first domain name and the second domain name;
locate both the first object and the second object in the domain name database;
determine a renewal date which is earlier than at least one of the first renewal date and the second renewal date;
synchronize as a backwards synchronization operation the first object and the second object to both have said renewal date, such that both the first domain name and the second domain name are configured to expire on said renewal date; and
send a synchronization response confirming the synchronization request.

18. A method for synchronizing management of a plurality of domain names in a Domain Name System (DNS), the method comprising the steps of:
receive a synchronization request for synchronizing a first object related to a first renewal date of a first domain name with a second object related to a second renewal date of a second domain name, the first object unique to the first domain name and the second object unique to the second domain name, the first object and the second object stored in a domain name database and the second domain name being an existing member of a domain name bundle, the synchronization request including an explicit identifier only of the first domain name but not of the second domain name;
use a bundle identifier of the domain name bundle associated with the explicit identifier of the first domain name to access a domain name list of the domain name bundle in order to identify the second domain name;
locate both the first object and the second object in the domain name database;
determine a renewal date which is earlier than at least one of the first renewal date and the second renewal date and calculate a backwards aggregate cost of a backwards synchronization operation;
calculate a forwards aggregate cost of a forwards synchronization operation, the forwards aggregate cost using said renewal date as a date later than the at least one of the first renewal date and the second renewal date, such that the backwards aggregate cost is less than the forwards aggregate cost;
synchronize as the backwards synchronization operation the first object and the second object to both have said renewal date, such that both the first domain name and the second domain name are configured to expire on said renewal date; and
send a synchronization response confirming the synchronization request.

19. A method for synchronizing management of a plurality of domain names in a Domain Name System (DNS), the method comprising the steps of:
receive a synchronization request for synchronizing a first object related to a first renewal date of a first domain name with a second object related to a second renewal date of a second domain name, the first object unique to the first domain name and the second object unique to the second domain name, the first object and the second object stored in a domain name database and the second domain name being an existing member of a domain name bundle, the synchronization request including an explicit identifier of the domain name bundle but not of first domain name nor of the second domain name;

use the explicit identifier as a bundle identifier of the domain name bundle associated to access a domain name list of the domain name bundle in order to identify the first domain name and the second domain name;

locate both the first object and the second object in the domain name database;

determine a renewal date which is earlier than at least one of the first renewal date and the second renewal date and calculate a backwards aggregate cost of a backwards synchronization operation;

calculate a forwards aggregate cost of a forwards synchronization operation, the forwards aggregate cost using said renewal date as a date later than the at least one of the first renewal date and the second renewal date, such that the backwards aggregate cost is less than the forwards aggregate cost;

synchronize as a backwards synchronization operation the first object and the second object to both have said renewal date, such that both the first domain name and the second domain name are configured to expire on said renewal date; and send a synchronization response confirming the synchronization request.

\* \* \* \* \*